United States Patent [19]

Nemirovsky et al.

[11] Patent Number: 5,117,387

[45] Date of Patent: May 26, 1992

[54] MICROPROGRAMMED TIMER PROCESSOR

[75] Inventors: Mario D. Nemirovsky, Goleta, Calif.; Matthew D. Sale, Kokomo, Ind.

[73] Assignee: Delco Electronics Corporation, Kokomo, Ind.

[21] Appl. No.: 233,678

[22] Filed: Aug. 18, 1988

[51] Int. Cl.[5] .................. G06F 9/26; G06F 9/32; G06F 9/40; G06F 1/08
[52] U.S. Cl. .................. 395/375; 364/231.5; 364/231.6; 364/241.9; 364/246.4; 364/247.7; 364/270.2; 364/270.3; 364/DIG. 1
[58] Field of Search ... 364/200 MS File, 900 MS File

[56] References Cited

U.S. PATENT DOCUMENTS

4,109,311 8/1978 Blum et al. .................. 364/200
4,297,743 10/1981 Appell et al. .................. 364/200
4,491,912 1/1985 Kainaga et al. .................. 364/200

Primary Examiner—Archie E. Williams, Jr.
Assistant Examiner—Emily Y. Chan
Attorney, Agent, or Firm—A. Frank Duke

[57] ABSTRACT

A microprocessor is configured as two virtual processors having separate program counters, a common memory and a common execution unit. The processors are configured in a two stage pipeline arrangement and the instructions are interleaved so that as one processor fetches instructions the other executes. One processor runs a fixed length loop of single instructions to provide service of input/output pins at regular and frequent times to afford high resolution. The other processor runs multiple instruction routines. The instructions of either processor can modify the instructions of the other and determine whether a given instruction should be executed. The microprocesor is used as a coprocessor to relieve a main microprocessor of the burdens of managing I/O pins and of running some complex algorithms.

4 Claims, 8 Drawing Sheets

| | MI FETCH / SI EXECUTE | | | | SI FETCH / MI EXECUTE | | | | MI FETCH / SI EXECUTE | | | |
|---|---|---|---|---|---|---|---|---|---|---|---|---|
| | 5 | 6 | 7 | 8 | 1 | 2 | 3 | 4 | 5 | 6 | 7 | 8 |
| POINTER TABLE RAM | MI READ | | SI WRITE | | SI READ | | MI WRITE | | MI READ | | SI WRITE | |
| INSTRUCTION FETCH | | MI | | | | SI | | | | MI | | |
| INDEX TABLE RAM | | MI READ | | SI WRITE | | SI READ | | SI WRITE | | MI READ | | MI WRITE |
| PARAMETER RAM | | MI WRITE | | MI READ | | SI WRITE | | SI READ | | MI WRITE | | MI READ |
| REQUEST FLAGS | | | | SI WRITE | MI | SI FLAG SELECT | | MI WRITE | | | | SI WRITE |
| DECREMENT REGISTER | | | TEST DEC REG | | | | | LOAD OR DECREMENT LOAD DOMINANT | | | TEST DEC REG | |

PRIORITY EVALUATION

Fig. 8

MICROPROGRAMMED TIMER PROCESSOR

FIELD OF THE INVENTION

This invention relates to a microprogrammed timer processor for servicing each of a plurality of input/output channels at a regularly recurring interval of time while concurrently performing other tasks.

BACKGROUND OF THE INVENTION

Automotive engine controllers use microprocessor based electronics for monitoring all the appropriate engine and transmission operating parameters and providing the control signals necessary to optimize the vehicle performance. A host microprocessor control unit (MCU) such as a Motorola MC6800 or MC68000 processor is the primary control but special calculations are often handled by a secondary programmable chip to furnish information to the MCU. Here it is proposed to provide a secondary IC called a timer I/O or TIO coprocessor which handles all the input and output functions for the control as well as to execute algorithms which relieve the MCU of some burdens.

It is desired that the TIO control external processes using time-based algorithms with a minimum of host overhead. The major goals of this IC are: programmability, resolution, throughput, and reduction of host MCU overhead. The inputs to the TIO include signals from the vehicle speed sensor, crankshaft and camshaft position sensors, mass air flow sensors, transmission gear sensor and others. The time between the occurrence of an event (a change in the signal) and the TIO's awareness of the event is the resolution. A high resolution is needed for accurate and timely processing. Throughput, which also should be high, is the speed at which events can be recognized, processed and acted upon. Programmability refers to the ease with which the function of the IC can be changed to execute new algorithms. Algorithms handled by the co-processor include calculations for spark timing, fuel injection, mass air flow input, stepper motor control, transmission control and vehicle speed sensor.

The timer operations can be seen as two distinctly different types of programs: complex algorithms of variable length and simple timing functions having high resolution. It is proposed to provide a processor arrangement for running both types of programs simultaneously so that the timing functions can be carried out with a high degree of accuracy and not degraded by compromise with the other programs. A number of ways to accomplish this goal are apparent but generally they involve hardware duplication and thus high expense, as well as difficult programming.

The U.S. Pat. No. 4,244,028 to Haines discloses a time shared adder controlled by interleaved clock pulses such that during one pulse instructions are fetched and during the next pulse the instructions are executed by the adder. During the fetching operation the adder is free to perform another function and according to the patent the hardware as arranged to use the adder to increment a register. There is no provision for simultaneously running two or more programs.

The U S. Pat. No. 4,320,453 to Roberts et al discloses a dual sequencer microprocessor utilizing a pipeline configuration and an address processing circuit having two sets of input lines and one set of output lines providing interleaved microinstructions for simultaneously controlling two real-time tasks.

A technique for running two or more programs concurrently without extensive hardware or programming penalties is reported in a pair of companion papers by Lee and Messerschmitt, "Pipeline Interleaved Programmable DSP's: Architecture," IEEE Trans. Acoust., Speech, Signal Processing, Vol. ASSP-35, p. 1320, September 1987, and "Pipeline Interleaved Programmable DSP's: Synchronous Data Flow Programming," IEEE Trans. Acoust., Speech, Signal Processing, Vol. ASSP-35, p. 1134, September 1987, which are incorporated herein by reference. According to these papers, a processor can simulate a plurality of machines by interleaving programs for the several machines and, if a pipelined configuration is used with the pipeline stages equal to the number of machines, a high processor utilization will be achieved and programming difficulties will be avoided.

We recognize that when the processor is used as two or more machines, each machine can be dedicated to a peculiar type of operation not affected by the functions of another machine. By applying the interleaved pipeline technique to the particular objective of the engine controller, one can achieve the execution of fairly complex algorithms of various running times and at the same time to regularly and frequently check the state of each input pin to obtain the high resolution. By providing a two stage pipeline and by interleaving the instructions of two different programs, a processor may be made to appear as two separate virtual machines running programs simultaneously and independently, although they share the same memory and execution unit. Then a program or a number of programs having complex algorithms can be run on one machine while the timing program can be run, without interruption, on the other machine.

SUMMARY OF THE INVENTION

It is therefore an object of the invention to provide a processor architecture suitable for concurrent execution of two or more programs each independent of the other. It is another object to provide such a processor architecture which permits a single instruction routine to run without interruption while a multiple instruction routine is running.

The invention is carried out by a microprogrammed timer processor for servicing each of a plurality of input/output channels at a regularly recurring interval of time while concurrently performing other tasks comprising; storage circuitry means for storing a plurality of single instruction programs and a plurality of multiple instruction programs, clock circuitry defining sequential fetch and execute cycles within an instruction cycle, control circuitry responsive to said clock circuitry for interleaving single instruction programs with instructions in said multiple instruction programs so that a single instruction program may be executed while an instruction from a multiple instruction program is being fetched, said control circuitry including time interval setting circuitry which establishes an execution loop containing a predetermined number of said single instruction programs to be executed in sequence to fix said regularly recurring interval.

The invention further comprises such a processor allowing instructions in one program to modify instruction pointers in the same program or in the other program.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

The invention is directed to a timer processor for any application although it has been developed especially as a coprocessor in an automotive engine controller and the description contains specific references to that application. In general it is configured to service a plurality of input/output channels at a regularly recurring interval of time while concurrently performing other tasks. As applied to automotive use a resolution on the order of, say, 5 microseconds is required. This processor allows that resolution to be achieved and to be a chosen fixed rate determined by programming.

Figure 1:
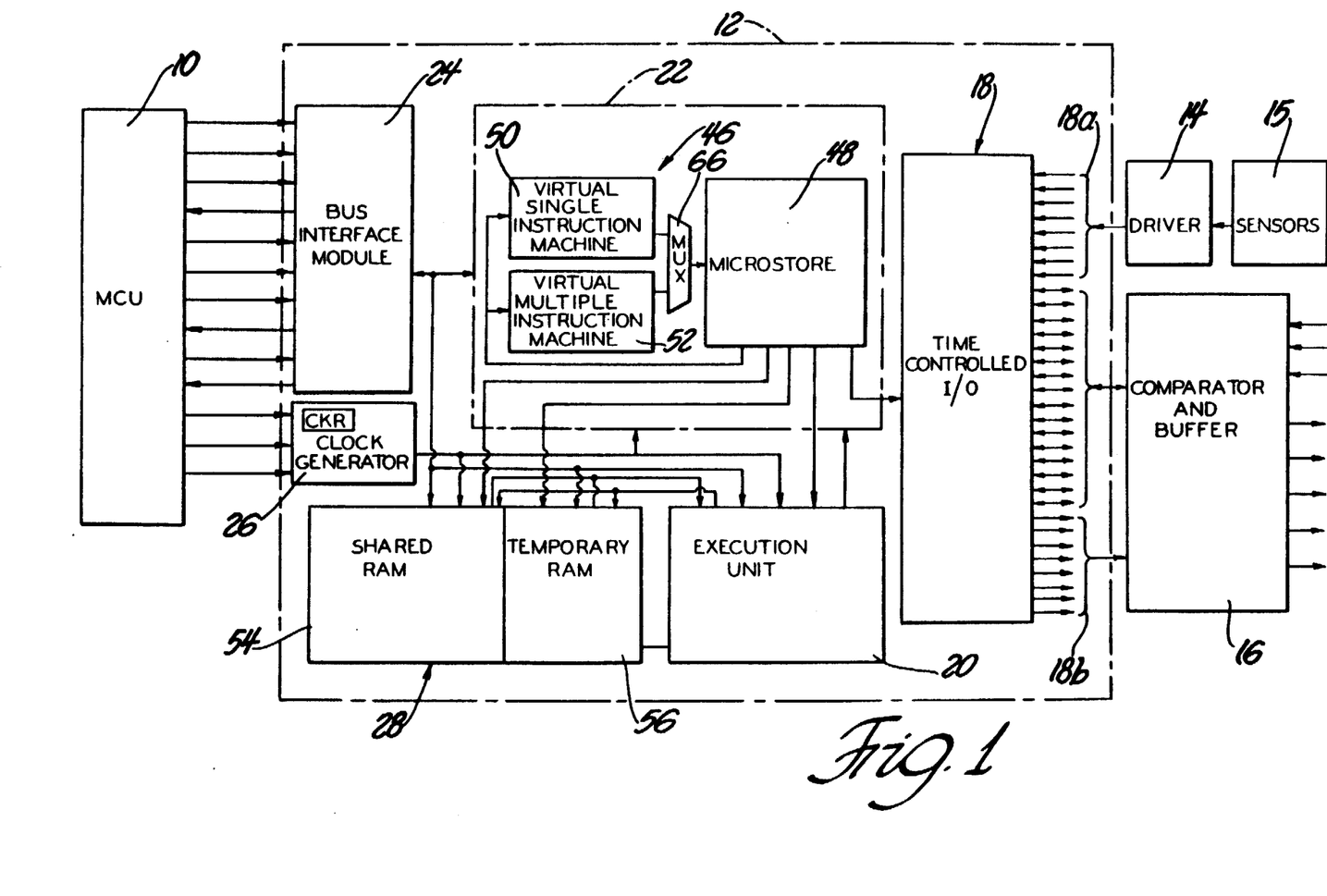
FIG. 1 is a block diagram of an engine controller incorporating a timer processor according to the invention.

FIG. 1 shows the overall scheme of an integrated circuit engine controller including a main microprocessor control unit (MCU) 10 and a timer input/output (TIO) 12 coupled to the MCU 10 via an 8 bit data bus and to a driver IC 14 serving sensors 15 and a comparator and buffer IC 16 via timer controlled I/O pins 18. Eight of the pins 18 are inputs 18a, eight pins are outputs 18b and the remaining sixteen pins are programmable I/O's which are controlled by microcode. If preferred, the pins may all be I/O pins.

Architectural Overview

The TIO 12 can be seen as a special purpose dual-processor system designed to control external events in real time. One processor guarantees the resolution of the occurrence of the event and the other provides the throughput necessary for complex algorithms. Six major blocks comprise the TIO 12: an execution unit 20, a control unit 22, a bus interface module 24, timer controlled I/O pins 18, a clock generator 26 and a parameter RAM 28.

Figure 2:
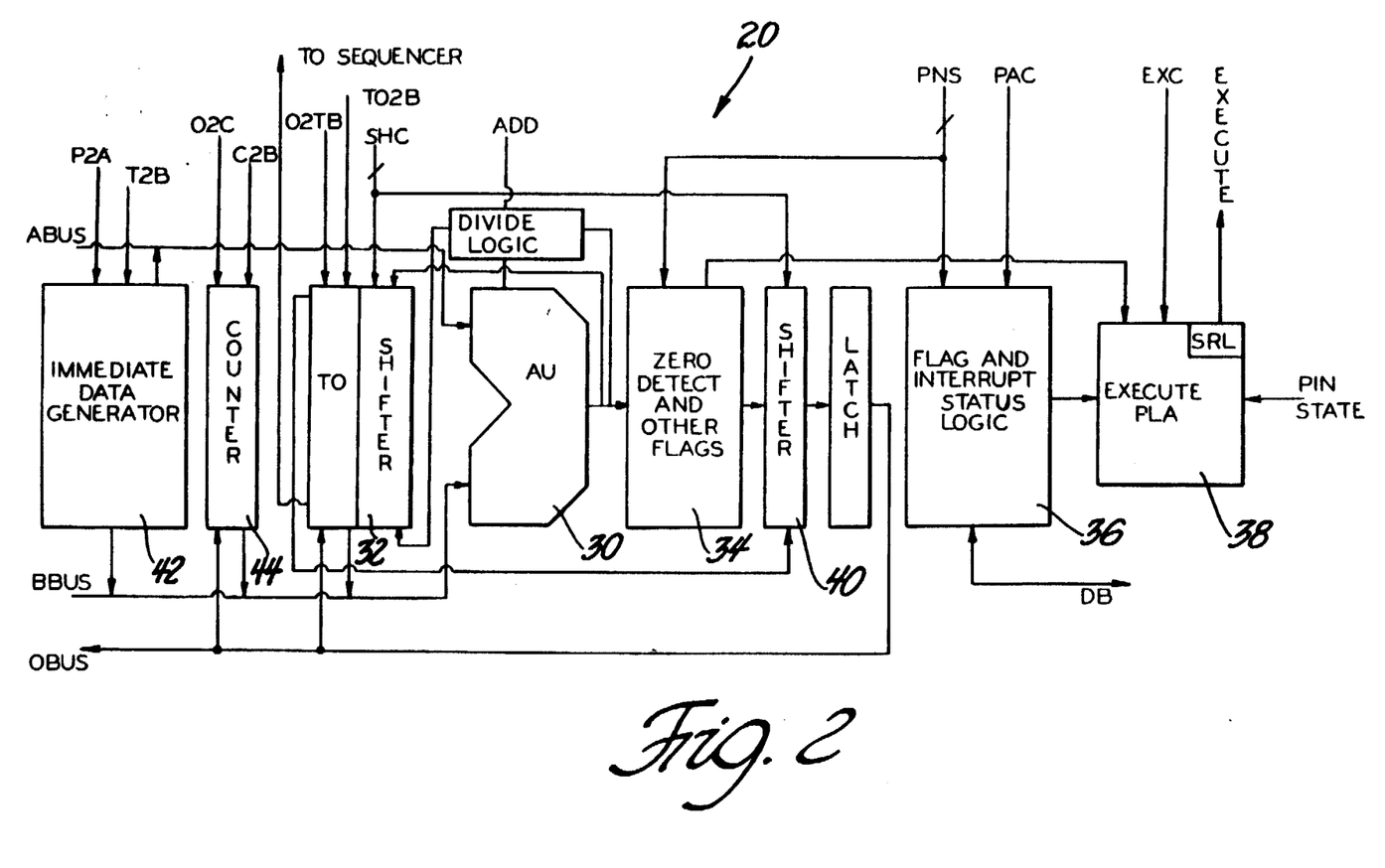
FIG. 2 is a block diagram of an execution unit of the timer processor of FIG. 1.

The execution unit 20, as best shown in FIG. 2, is a 16 bit data path consisting of an arithmetic unit (AU) 30, a combination shift register and temporary register 32, zero detect logic 34, a flag register 36, an execute PLA (programmable logic array) 38, a second shifter 40, an immediate data generator 42 and a 16 bit counter 44. Two buses, A and B serve as input paths to the arithmetic unit while bus O carries the output data. All arithmetic operations are executed in the execution unit 20 which is shared by the two virtual machines in the control unit 22. The AU output is tested by the PLA 38 to determine whether an execution condition is met. The PLA has the ability to check the state of any AU result bit, whether the AU result is positive, negative or zero, or the state of a TIO pin or flag, for example.

The control unit 22 is subdivided into two major blocks, a sequencer 46 and a microcode store 48. The microcode store is preferably in the form of a ROM although RAM or other memory technology can be used instead. The control unit steps through the microinstructions contained in the microcode store to control all operations within the TIO. By swapping back and forth between two microprogram pointers each instruction cycle, two virtual machines 50 and 52 exist within the TIO. The first machine is referred to as the single instruction machine (SIM) 50. This machine repetitively sequences through a series of 1 to 32 pointer table entries that point to single instruction routines. The second machine is called a multiple instruction machine (MIM) 52. After one of 8 to 16 pointer table entries is selected based on a variable priority, this machine 52 sequences through the selected microprogram until completion. When this microroutine is finished, another one is selected by the priority logic. If no MIM routines are pending, no-ops are executed in the MIM time slots.

The bus interface module 24 facilitates communication between the TIO 12 and the MCU 10 over an 8 bit data bus. All accesses to the TIO is by a double byte (word) access and the TIO always assumes that the first access is the high byte (even address) and the second is the low byte (odd address).

The clock generator 26 provides a broad range of frequencies (1 to 25 MHz) to accommodate various MCU needs. The TIO will typically need to operate at 8 MHz or more to achieve the desired resolution and throughput. A programmable frequency multiplier is built into the clock generator and a prescalar is also provided to extend the frequency range from 0.125 to 8 times the input clock. The multiplication factor will be controlled via the host MCU. The selected rate establishes the instruction cycle. The clock signal is transmitted as two 50% duty cycle signals 90 degrees out of phase which can be locally interpreted as four "ticks" per cycle to enable a sequence of timed events within each instruction cycle.

The parameter RAM 28 comprises a shared RAM 54 and a temporary RAM 56. The shared RAM is a dual port RAM tied to the host MCU 10 and to the execution unit 20. The shared RAM outputs data on the A bus and is written from the O bus of the execution unit. This memory is 128 words by 16 bits. The temporary RAM 56 is a 64 word by 16 bit dual port RAM which acts as a temporary register array for the TIO. One port is tied to the A bus and the other is tied to the B bus of the execution unit 20. This allows two different temporary registers to be involved in an arithmetic operation. The temporary RAM is written by the O bus, so both the shared RAM 54 and the temporary RAM 56 are written from the same bus.

Pipeline Interleaving

Figure 3:
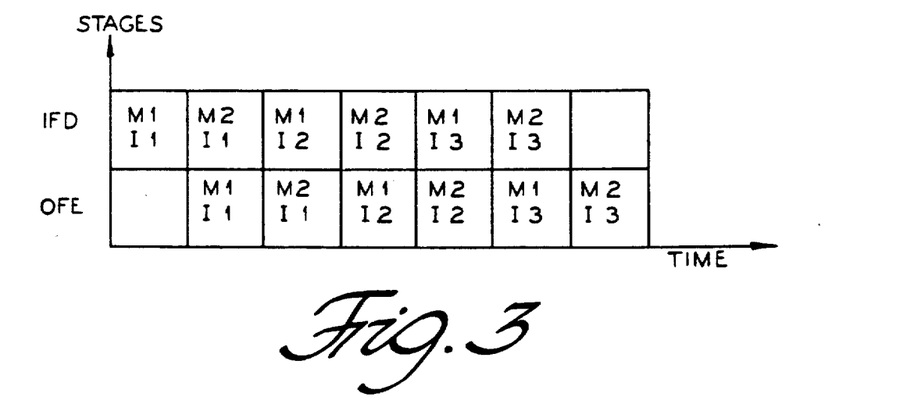
FIG. 3 is a space-time diagram of an interleaved processor.

The architecture is specifically designed to carry out a two stage pipeline dual routine interleaving technique. That is two routines are run at the same time, one on each machine 50, 52, using the same execution unit, control unit and memory without data collisions. FIG.

3 is a space-time diagram illustrating how this is accomplished. The instruction fetch and decode (IFD) operation is handled separately from the operand fetch and execute (OFE) operation such that both can occur in the same time frame. In the diagram M1 is machine 1 and M2 is machine 2. The instructions for each machine are termed I1, I2 and I3. Instruction 1 for M1 is fetched and decoded in the first frame and executed in the second frame and instruction 1 for M2 is fetched in the second frame and executed in the third frame and so on such that each stage of the processing unit keeps busy to optimize throughput. This is in contrast to a two stage nonpipelined processor which keeps one stage idle in each frame. It has the advantage over a non-interleaved pipelined processor which mandates flushing the pipeline whenever branching occurs because initially the wrong instruction has been fetched, thereby causing a loss of time. In the interleaved processor the correct address of each instruction is known before it is fetched so that flushing is not needed. The above mentioned papers by Lee and Messerschmitt further describe the pipeline interleaving.

The Control Unit

Figure 4:
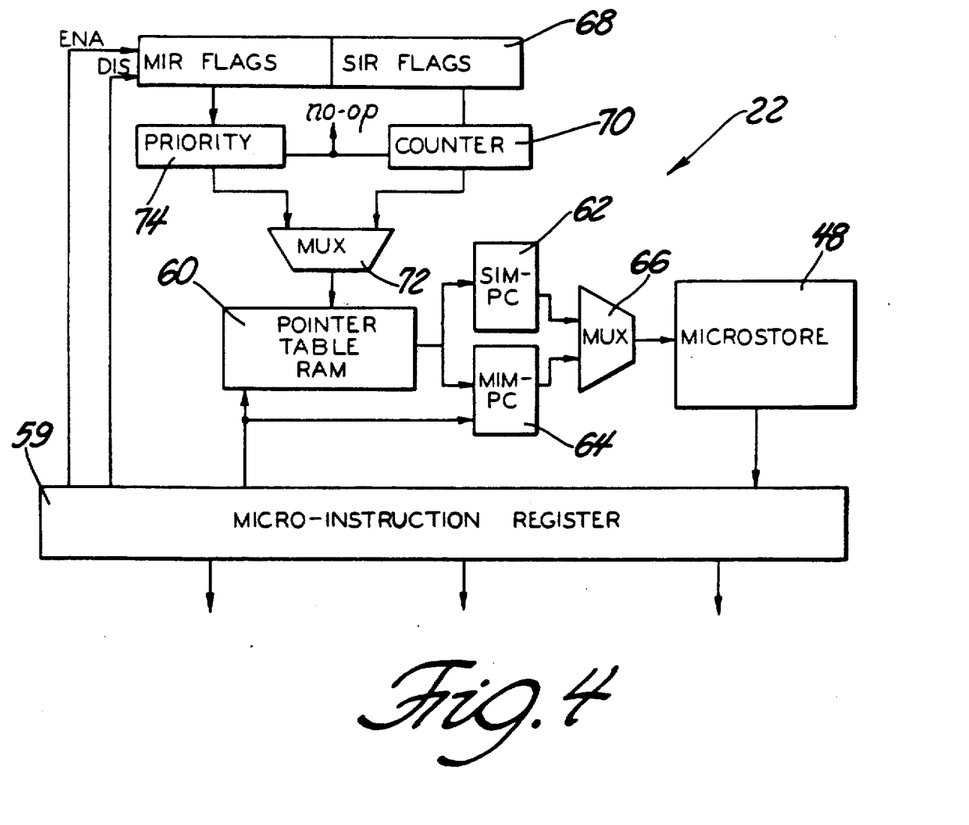
FIG. 4 is a simplified block diagram of a control unit of the timer processor according to the invention, FIGS. 5a and 5b together comprise a detailed block diagram of the control unit of FIG. 4.

To carry out the pipeline interleaving technique the control unit 22 defines the two virtual machines and manages their operation. A simplified version of the control unit is shown in FIG. 4 to facilitate the description of the machine architecture.

The microstore 48 contains space for 256 micro-instructions each embodied in a 64 bit word. Each word is divided into fields which dedicate prescribed bits to certain functions. The fields and the number of bits in each field are:

P2A (9) Parameter to A bus
T2B (7) Temporary to B bus
SUB (1) Subtract/Add
SHC (2) Shift control
PWR (9) Parameter Write address
PWU (1) Write Unconditional
EXC (4) Execute (Branch) Condition
PNS (6) Pin/Flag Select
PAC (2) Pin Action Control
ENA/DIS (2) Enable/Disable
PRB (1) Present/Requested bit
REQ (6) Requested Address and/or Request Flag
DEC/END (2) Decrement/END Register
NAP (8) Next Address Pointer
NIP (4) Next Index Pointer The P2A and T2B fields determine what values will be placed on the A and B buses. SUB and SHC control the arithmetic unit, AU, and the shifting of its output to provide addition, subtraction, multiplication and division. PWR determines where the AU output is written. This is conditional on the execute condition, EXC, or PWU. The PWU bit can command the TIO to write to the PWR destination regardless of the execute condition. EXC is the execute condition which requires a certain AU output condition or a certain flag or pin condition to be met before the write can take place. PNS selects a pin, flag or AU output bit and PAC controls the assertion, negation and direction of a selected pin or flag. ENA/DIS bits control the assertion and negation of the REQ flags to enable or disable a MIM or SIM instruction. The PRB allows the SIM or MIM routines to modify their own pointers or another routine's pointer. REQ specifies a request flag to be affected by ENA/DIS or an address in the pointer table to be written. DEC/END bits have different meanings for the SIM and MIM and determine pointer table modification or pointer incrementing. NAP contains an address that can be loaded into RAM 60 or the MIM-PC. NIP is the next index pointer which is concatenated with the effective address prior to writing to either the pointer table or to the MIM-PC.

Thus each instruction is able to effect direct control of many functions regarding the particular action of the execution unit, the status of any pin, and the address or effect of the next instruction. Each instruction, when accessed, is dumped to a micro-instruction register 59 which serves as an output latch from which each field is delivered to its destination. The register 59 is capable of holding more than one micro-instruction thereby facilitating the pipeline operation. The register 59 also is able to receive data from an index register and add it to certain prescribed fields.

A pointer table RAM (PTRAM) 60 contains 40 12 bit words comprising pointers including microstore addresses (8 bits) and index register addresses (4 bits). Up to 32 words may be used as single instruction pointers (SIP) and at least 8 words are reserved for multiple instruction pointers (MIP) although the partition is variable, e.g., the table may contain 24 SIP's and 16 MIP's. Each MIP contains the starting address of a routine in the microstore. The pointer table is initially loaded from the host MCU 10 but the pointers are thereafter subject to being modified by the micro-instructions or by the host processor.

A program counter for the single instruction machine (SIM-PC) 62 and a program counter for the multiple instruction machine (MIM-PC) 64 comprise 12 bit registers or presettable counters with incrementing ability which receive addresses from the pointer table 60 and access the microstore 48 through a multiplexer 66 which alternates between the SIM-PC 62 and the MIM-PC 64. The control input labelled "INST" for this and some other multiplexers indicates that the multiplexer toggles for each instruction period to switch between the two machines. Every SIM address is fed to the SIM-PC 62 from the pointer table since a complete SIM routine contains only one instruction. Thus the time required for addressing all the SIM instructions is dependent on the number of such instructions in the table and is a fixed value, so that each instruction is addressed on a regular time basis fixed by the program. No interruption of the SIM process is permitted for any reason so that the SIM instruction cycle is a preset value which establishes the machine resolution.

A given pointer may not always have the same microcode address because the pointer table instructions may be modified. One way the address is changed is by the NAP field in the current instruction which may be written from the micro-instruction register 59 to the RAM 60. Also a given instruction will not always be executed: if a flag for that instruction is cleared, a "no-op" (no operation) will occur to consume that time frame and assure that the SIM cycle time does not change. During a no-op the microcode address is fetched but the execution unit ignores the instruction for that cycle.

In contrast to the SIM, the MIM may have a large number of instructions per routine. After an entry address is provided by the pointer table, the MIM-PC 64 is incremented by one to go to the next stored address or, in the case of branching, an address is furnished to the MIM-PC by the NAP field of the present instruction to implement a microcode jump. It is also possible for the NAP to be written to the pointer table to change the starting address for the routine the next time it is run. When a routine is completed the END bit is set to cause a new multiple instruction routine to begin. The new routine will be selected on the basis of priority flags assigned to the RAM 60 pointers.

An instruction in either the SIM or the MIM can enable or disable any flag, thus facilitating cross communication between the machines. A flag register 68 contains request flags numbered 0 through 39 corresponding to the pointers 0 through 39 in the pointer table. The REQ field in the micro-instruction code specifies a flag to be affected and the ENA/DIS field controls the setting or clearing of the specified flag. A counter 70 coupled to the pointer table via a multiplexer 72 steps through the SIM pointers sequentially to access the SIM pointers. If a request flag for a SIM pointer is cleared, a no-op will be executed during that pointer's time slot, otherwise, it will execute normally.

The priority of MIM pointers is established primarily by the pointer position in the pointer table. Generally, the desired priority of the several MIM routines can be determined at the time of programming. The highest priority routine will have its pointer in position 39 and the next highest will be in position 38, etc. The priority is secondarily affected by the flags which may be cleared to temporarily pass the priority to a lower ordered routine. Accordingly, if multiple MIM request flags are set to establish a queue of programs to be run, the set pointer having the highest number will execute first.

A priority logic circuit 74 selects the highest number set flag at the time a previous routine has finished and selects the corresponding MIM pointer via the multiplexer 72, thereby alternating that pointer number with the sequencing SIM pointer. When the MIM routine has finished, the next highest priority flag will be executed, assuming that the first routine cleared its own MIM request flag. A higher priority program can not interrupt any executing MIM routine. If all request flags for the MIM pointers are cleared and the last MIM routine has ended. no-ops will be executed until a request flag is asserted.

To summarize the operation of the control unit 22, the multiplexer 66 alternately connects the SIM-PC and the MIM-PC to the microstore 48 to alternately fetch SIM and MIM instructions, resulting in interleaved instructions. All the SIM instructions are addressed by pointers in the pointer table 60 and continually loop through in the same order so that each pointer recurs at the same fixed rate which sets the timer resolution. Each instruction will be executed if its associated request flag is set. The entry instruction for a MIM routine originates from the pointer table but successive instruction addresses in the routine are obtained by incrementing the previous address or are supplied by the previous instruction. When a MIM routine is completed the next routine is started by the pointer table MIM pointer having the highest priority enabled request flag.

Figure 5A:
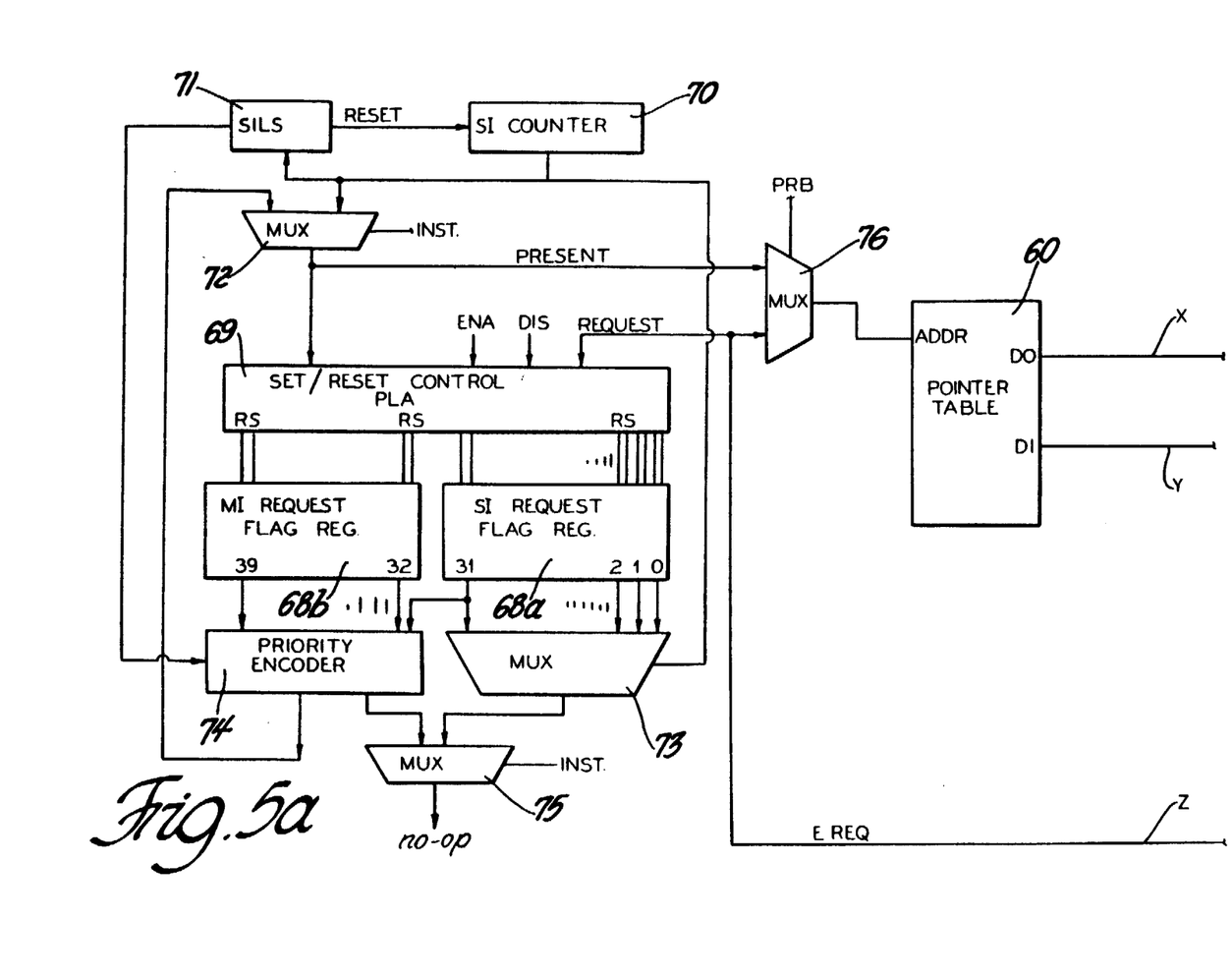
Figure 5B:
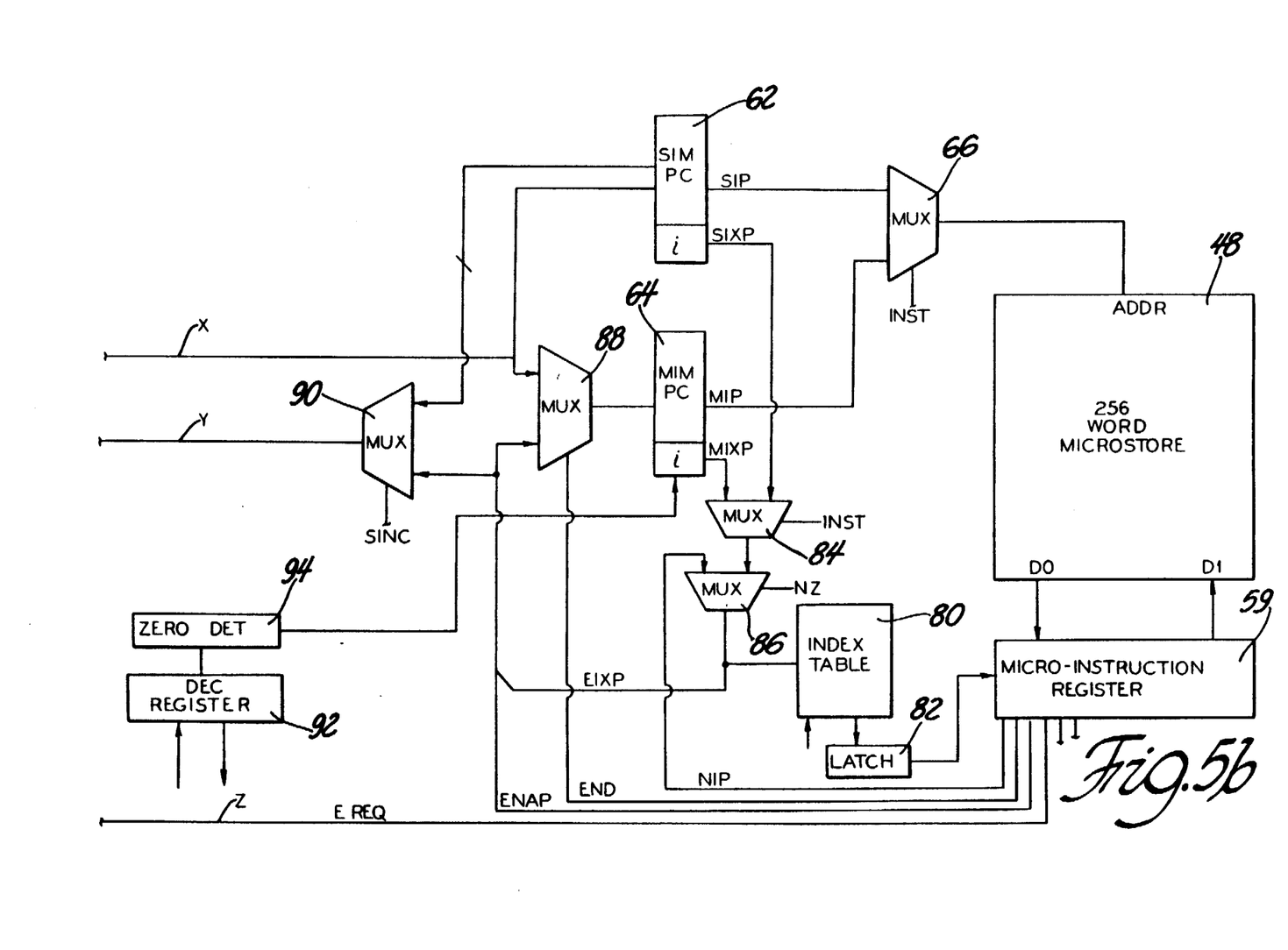

FIGS. 5a and 5b expand upon the FIG. 4 control unit diagram by including additional detail and additional functions. Lines X, Y and Z connect FIG. 5a with 5b.

FIG. 5a shows the request flag management circuit which includes the SI request flag register 68a containing a register bit for each flag 0 through 31 and the MIM request flag register 68b which has a register bit for each flag 32 through 39. Because of the variable partition between the SIM and the MIM, the higher order SI bits may be assigned to the MI register 68b. Each register bit comprises a flip-flop responsive to set and reset input signals. A set/reset control PLA 69 provides a set and a reset output for each register bit. Each bit is addressed by a "present" or a "request" bus and the addressed bit is controlled by enable (ENA) and disable (DIS) bits in the microcode instructions to set or clear a given bit in a register 68a or 68b. No flags are affected if both ENA and DIS equal zero. If ENA is set and DIS=0, then the request flag selected by the "request" bus is set. If ENA=0 and DIS=1, the request flag selected by the "request" bus is reset. If ENA=-DIS=1, the request flag selected by the "request" bus is set and the request flag selected by the "present" bus is cleared. The last combination allows an instruction to disable its pointer and enable another pointer at the same time. This provides the ability for a routine to disable itself when it completes a task so that another routine can be selected. The "request" bus is the same as the line labeled EREQ from the micro-instruction register 59.

The SI counter 70 increments from zero to the highest number of the SIM pointers. This number is stored in the SILS (SI loop size) register 71 which resets the counter 70 to zero when the SILS number is reached. The counter output is fed to the input of the multiplexer 72 and to the control input of a multiplexer 73. The multiplexer 73 receives its inputs from the SI request flag register 68a so that the state of each register bit is sampled as the counter steps through the SI instructions. For any flag which is clear an output is delivered to a multiplexer 75 which issues a no-op signal. A priority encoder 74 tests all the MIM request Flag register bits higher than the SILS number to determine the highest set flag and feeds this flag number to the multiplexer 72. Then the multiplexer 72 output as it switches for each instruction period is the current flag number on the "present" bus for the MIM and SIM respectively. The "present" bus as well as the EREQ bus are inputs to the multiplexer 76 which addresses the pointer table 60. The pointer number on the present bus is directed to the program table when the PRB bit in the micro-instruction is 1 but the EREQ address from the micro-instruction is used when the PRB bit is 0. In summary, assuming the PRB bit is 0, the counter 70 drives the SIM program pointers through the SI loop and each single instruction is executed in sequence unless the respective flag for that instruction is cleared and a no-op occurs. For the MIM, the highest register bit which is enabled is selected by the priority encoder and applied to the pointer table. This has no immediate effect until a MIM routine has ended and the next routine is sought.

One of the additional functions in FIG. 5b is indexing which is useful to expand addressing capability while economizing memory space. An index table 80 which comprises 16 4 bit words has an output to a latch 82 which in turn is connected to the micro-instruction register 59. The latch contents can replace the four least significant bits of certain address fields in the micro-instruction. The eligible address fields are PNS, P2A, T2B and PWR. The indexing mode is selected when the four least significant bits of an address field equal 0000. The indexed address is then calculated by concatenation of the upper bits of the address field with the latched value of the index register. The register value can be modified by microcode. Also, the index register pointer can be modified via microcode or by the host MCU. Indexing can also be applied to the REQ, NIP and NAP fields under control of the PWR field.

The index pointer comprises the upper four bits of each pointer table word and comprises the address of one of the 16 index registers. The current index pointer is entered into the SIM-PC or MIM-PC along with the program pointer. Then the single instruction index pointer, SIXP, or the multiple instruction index pointer, MIXP, is selected by a multiplexer 84 to be fed through another multiplexer 86 to the index table 80. Multiplexer 86 has an input from the NIP field of the microinstruction register 59 and is toggled by the NIP field value so that the NIP address can be chosen when NIP is non-zero (NZ). The new effective index pointer, EIXP, points to a location in the index table 80 which may be loaded with a value from the AU output and is also concatenated with the effective NAP field (ENAP) and selectively entered into the MIM-PC and the pointer table via multiplexers 88 and 90 respectively to implement a microcode jump or branch. For the MIM, when the field PRB=1 the new address is written to the MIM-PC; otherwise it can be written to the pointer table, both conditioned on execution of the instruction. For the SIM, when PRB=1, the new address is written to the PTAM location pointed to by "present" bus. When PRB=0, the new address is written to the location pointed to by the "request" bus in either machine. The multiplexer 88 is also the means for gating an entry of a new MIP pointer from the pointer table to the MIM-PC when the END bit is set. The multiplexer 90 is effective to allow writing an incremented pointer and the index pointer from the SIM-PC or ENAP and EIXP to the pointer table to update the current pointer address under conditions determined by the coded values for DEC/END and the value of a flag or pin selected by PNS as further illustrated by the flow chart of FIG. 6.

Figure 6:
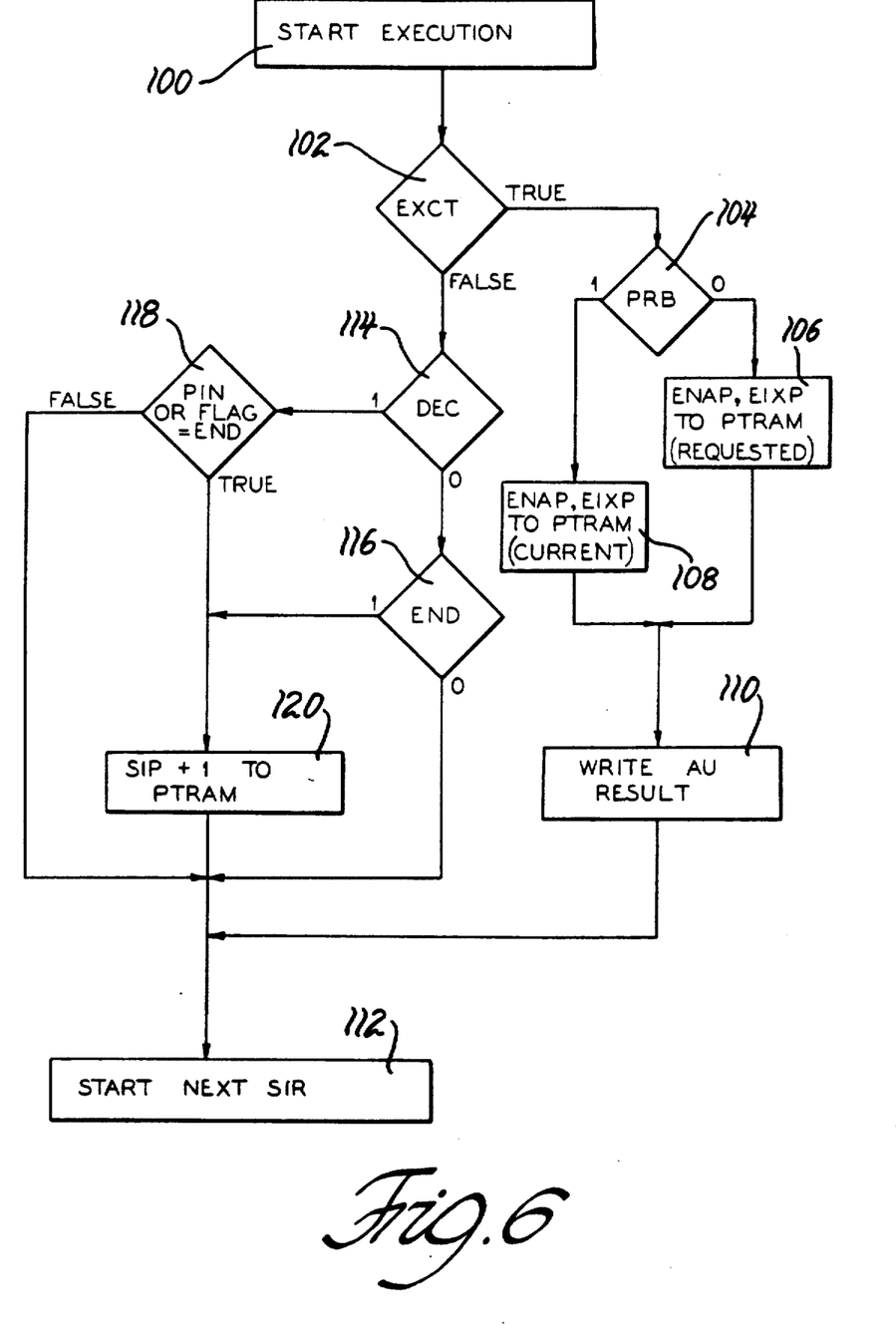
FIG. 6 is a flow chart illustrating instruction modification logic of a single instruction processor according to the invention.

FIG. 6 is a flow chart illustrating the modification of the pointer SIP of the SIM. After START EXECUTION as indicated at block 100 the execute condition is tested in PLA 38 as shown at block 102. If the execution condition is met ENAP and EIXP are written to the present pointer in PTRAM 60 if PRB=1 or to the requested pointer if PRB=0, and the next SIM routine is started as shown in blocks 104-112. If the execution condition is not met, and both DEC=0 and END=0, the next routine is started without RAM 60 modification as shown by the blocks 114 and 116. If DEC=1 and the PNS designated pin or flag is not equal to the END bit value, the pointer table is not modified as shown by block 118. However if that pin or flag is equal to the END bit value, or if DEC=0 and END=1, SIP is incremented at block 120 and written to the pointer table PTRAM. It is this latter condition which applies the single instruction increment control SINC to the multiplexer 90.

A decrement feature of the MIM comprises a decrement register 92 and a zero detector 94 coupled to the MIM-PC. The decrementer is specifically for divide and multiply operations but can be used to repeat any instruction sequence up to 32 times. If the DEC microcode bit is set, the decrement register value (DREG) is first tested to see if it equals zero. If the decrement register does not equal zero and the execute condition is true, then the decrement register will be decremented and the branch specified by the NAP field will be taken. If the decrement register has reached zero, or if the execute condition is not met, the branch will not be taken and the decrement register will remain unchanged and the MIM-PC will be incremented by one. In an MIM instruction, if the END bit is set at the same time as the DEC bit, then END will not take effect until the decrement register equals zero.

Figure 7:
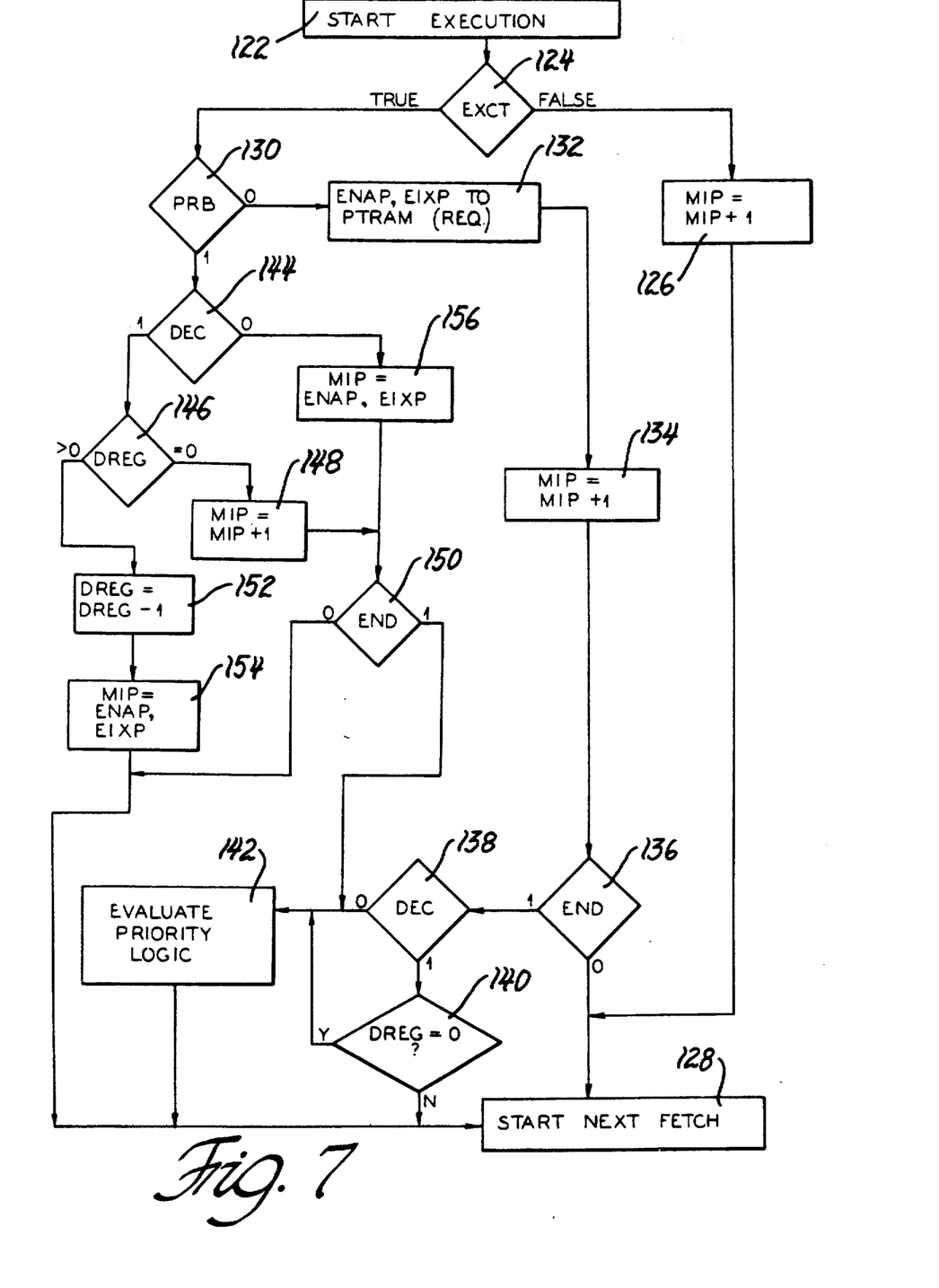
FIG. 7 is a flow chart illustrating instruction modification logic of a multiple instruction processor according to the invention.

FIG. 7 is a flow chart illustrating the modification of the pointer MIP of the MIM. After START EXECUTION at block 126 the execute condition is tested at block 124. If it is false, the MIP is incremented at block 126 and the next fetch is started at block 128. If the execution condition is met (true) the PRB bit is tested at block 130. If PRB=0, ENAP and EIXP fields from the instruction are written to the present pointer in the pointer table to modify the routine the next time it is run as indicated by block 132. Then MIP is incremented at block 134 and the END bit is tested at block 136. If END=0, the next fetch is started; if END=1, DEC is tested at block 138. If DEC=0, or if DEC=1 and the decrement register DREG=0, the priority logic is evaluated as indicated by blocks 140 and 142 to find the highest priority REQ flag and the next fetch is started. If the DEC=1 and DREG>0 the next fetch is started. When the PRB=1 and DEC=1, DREG is tested and if it is 0 the MIP is incremented and the END bit is tested as indicated by blocks 144-150. If END is 0 the next fetch is started and if it is 1 priority is evaluated. If DREG>0 it is decremented, MIP is set equal to ENAP and EIXP and the next fetch is started as indicated by blocks 152 and 154. When the PRB=1 and DEC=0, MIP is set equal to ENAD and EIXP and the next fetch is started as indicated at 156.

Figure 8:
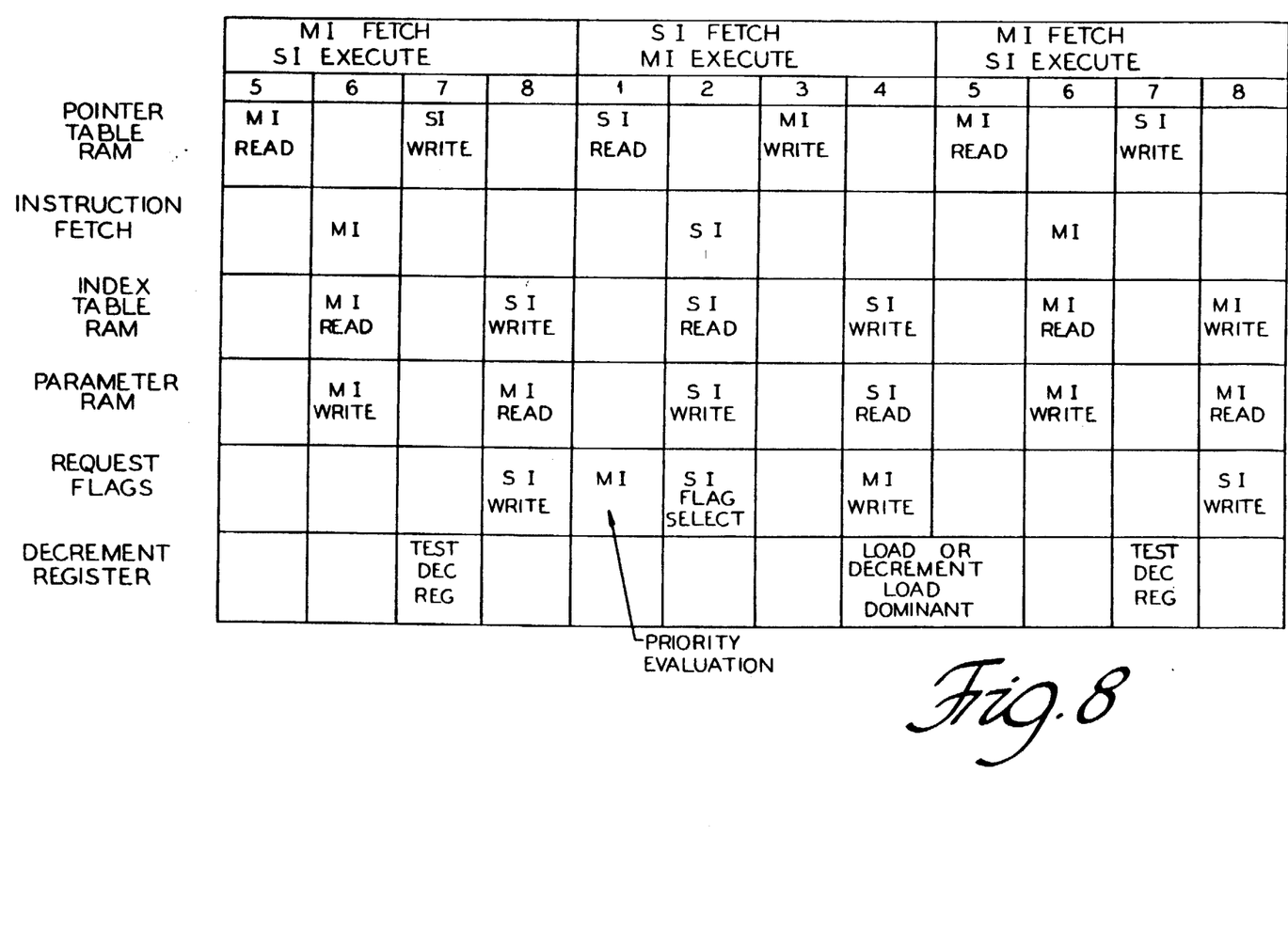
FIG. 8 is a timing diagram illustrating the major control unit events in interleaved processing machines.

FIG. 8 is a timing table illustrating the relative timing of the major control unit events. The heading numbers refer to specific time "ticks" within the TIO, four ticks being required for each instruction cycle. A complete MIM instruction cycle is shown followed by a SIM instruction cycle complete except for the write to parameter RAM. To complete that write, an overlap of two more ticks are required. The chart reveals the events affecting pointer table RAM, instruction fetch, index table RAM, parameter RAM, request flags, and decrement register. Considering only the MI events, MI fetch is initiated by reading the pointer table in tick 5 and then the instruction is fetched from the microstore and the index table is read in tick 6. The MI write to parameter RAM in tick 6 is a vestige of the previous MI cycle. In tick 7 the decrement register is tested and in tick 8 the MI machine reads from parameter RAM. Beginning the execute phase, in ticks 1 and 2 the flag priority is evaluated. In tick 3, a MI write to pointer table occurs and in tick 4 there are MI writes to the index table and to request flags. The decrement register is loaded or decremented. The MI execution is completed in tick 6 with a write to parameter RAM. The SI events follow a similar pattern, starting at tick 1 so that the SI fetch events are concurrent with MI execute events and vice versa. The reads and writes are interleaved such that, for example, the MIM always has the latest MI information, but not necessarily the latest changes made by the SIM. The SIM pattern repeats without interruption to insure the integrity of the timing resolution. The MIM, on the other hand, can experience delays when the host MCU accesses the TIO to read or write flags, pointer addresses or parameter data, for example, these events causing the loss of an MI cycle.

It will thus be seen that very efficient operation is provided by interleaving the operations of two very different virtual processors performing different but complementary functions with each processor having full use of the data of the other and able to alter the instructions of the other processor as well as its own.

The embodiments of the invention in which an exclusive property or privilege is claimed are defined as follows:

1. A microprogrammed timer processor for servicing each of a plurality of input/output channels at a regularly recurring interval of time while concurrently performing other tasks comprising;

storage means for storing a plurality of single instruction programs and a plurality of multiple instruction programs and including address means for accessing the instructions stored in said storage means, clock means defining sequential fetch and execute operations within an instruction cycle, instruction execution means responsive to said clock means for receiving and executing said instructions one at a time and including an instruction register for holding said instructions so that they can be interpreted and acted upon, control means responsive to said clock means for fetching said instructions from said storage means and for interleaving single instruction programs with instructions in said multiple instruction programs so that a single instruction program is executed while an instruction from a multiple instruction program is being fetched, said control means further including time interval setting means for establishing a single instruction execution loop size corresponding to a predetermined number of said single instruction to fix said regularly recurring interval, a table of single instruction pointers addressing said predetermined number of single instruction programs and of entry pointers addressing entry instructions of multiple instruction programs, means including the entry pointers for generating successive multiple instruction pointers, and the control means for interleaving further comprising means for alternately implementing the single instruction pointers and said multiple instruction pointers.

2. The invention as defined in claim 1 wherein the control means includes means responsive to instructions in either said single or multiple instruction programs for modifying either of said pointers.

3. The invention as defined in claim 1 wherein the control means includes a flag register holding a flag for each pointer in the table for indicating whether a corresponding instruction should be executed, and means responsive to instructions in either said single or multiple instruction programs for modifying the flags to control instruction execution.

4. The invention as defined in claim 1 wherein the control means includes a flag register holding a flag for each entry pointer in the table for indicating whether a corresponding program should be executed, priority logic means responsive to the content of said flag register and the completion of a multiple instruction program for determining which multiple instruction program to run next, and means responsive to instruction in either said single or multiple instruction programs for modifying the flags and the pointers.

* * * * *